(12) United States Patent
Thomson et al.

(10) Patent No.: US 9,310,081 B2
(45) Date of Patent: Apr. 12, 2016

(54) METHODS OF FABRICATING FUEL INJECTORS USING LASER ADDITIVE DEPOSITION

(75) Inventors: Neal A. Thomson, West Des Moines, IA (US); Matthew R. Donovan, Ankeny, IA (US); David H. Bretz, West Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 13/470,435

(22) Filed: May 14, 2012

(65) Prior Publication Data

US 2013/0298403 A1    Nov. 14, 2013

(51) Int. Cl.
| | | |
|---|---|---|
| *B23K 1/00* | (2006.01) | |
| *F23R 3/28* | (2006.01) | |
| *F02C 7/22* | (2006.01) | |
| *B23K 26/32* | (2014.01) | |

(52) U.S. Cl.
CPC ............... *F23R 3/283* (2013.01); *B23K 26/32* (2013.01); *B23K 26/342* (2015.10); *F02C 7/22* (2013.01); *B23K 2203/08* (2013.01); *B23K 2203/50* (2015.10); *Y10T 29/494* (2015.01)

(58) Field of Classification Search
CPC .... B23K 26/345; B23K 26/3206; F02C 7/22; F23R 3/283
USPC ............... 29/402.1, 402.18, 890.02, 490.09; 60/739, 740, 746, 747, 800; 75/240, 75/255; 123/468; 138/120; 239/406, 600
See application file for complete search history.

(56) References Cited

U.S. PATENT DOCUMENTS

| | | | |
|---|---|---|---|
| 5,097,657 A | * | 3/1992 | Shekleton et al. ............... 60/772 |
| 5,988,531 A | * | 11/1999 | Maden et al. .................. 239/406 |
| 6,269,540 B1 | | 8/2001 | Islam et al. |
| 6,351,948 B1 | * | 3/2002 | Goeddeke ........................ 60/740 |
| 6,376,103 B1 | * | 4/2002 | Sampath et al. ............... 428/663 |
| 7,984,547 B2 | | 7/2011 | Steinhardt |
| 2011/0052386 A1 | * | 3/2011 | Schoonover et al. ...... 415/208.1 |
| 2012/0247626 A1 | * | 10/2012 | Franchet et al. ............... 148/676 |

FOREIGN PATENT DOCUMENTS

| | | |
|---|---|---|
| EP | 2375164 A2 | 10/2011 |
| GB | 2355302 A | 4/2001 |
| WO | WO-0140710 A1 | 6/2001 |
| WO | WO 2011070302 A1 * | 6/2011 |

OTHER PUBLICATIONS

Christensen et al.; "Nickel Brazing Below 1025 C of Untreated INconel 718"; Oct. 1974; Welding Research Supplement; pp. 460-465.*

(Continued)

*Primary Examiner* — David Bryant
*Assistant Examiner* — Lee A Holly
(74) *Attorney, Agent, or Firm* — Locke Lord LLP; Scott D. Wofsy; Joshua L. Jones

(57) ABSTRACT

A method of fabricating a fuel injector is disclosed which includes the steps of forming a structural portion of a fuel injector from an alloy having a first mechanical property, and then adding an alloy having a second mechanical property on a surface area of the structural portion to enhance the mechanical properties of the fuel injector.

3 Claims, 15 Drawing Sheets

(56) References Cited

OTHER PUBLICATIONS

Special Metals; INCONEL alloy 718.*
Tantaline; Chemical Composition of Hastelloy.*

Xue, et al., "Laser Cladding of IN-625 Alloy for Repairing Fuel Nozzles for Gas Turbine Engines," Paper #802, Industrial Materials Institute, National Research Council of Canada, Pratt and Whitney Canada, Ontario Canada (Undated).

* cited by examiner

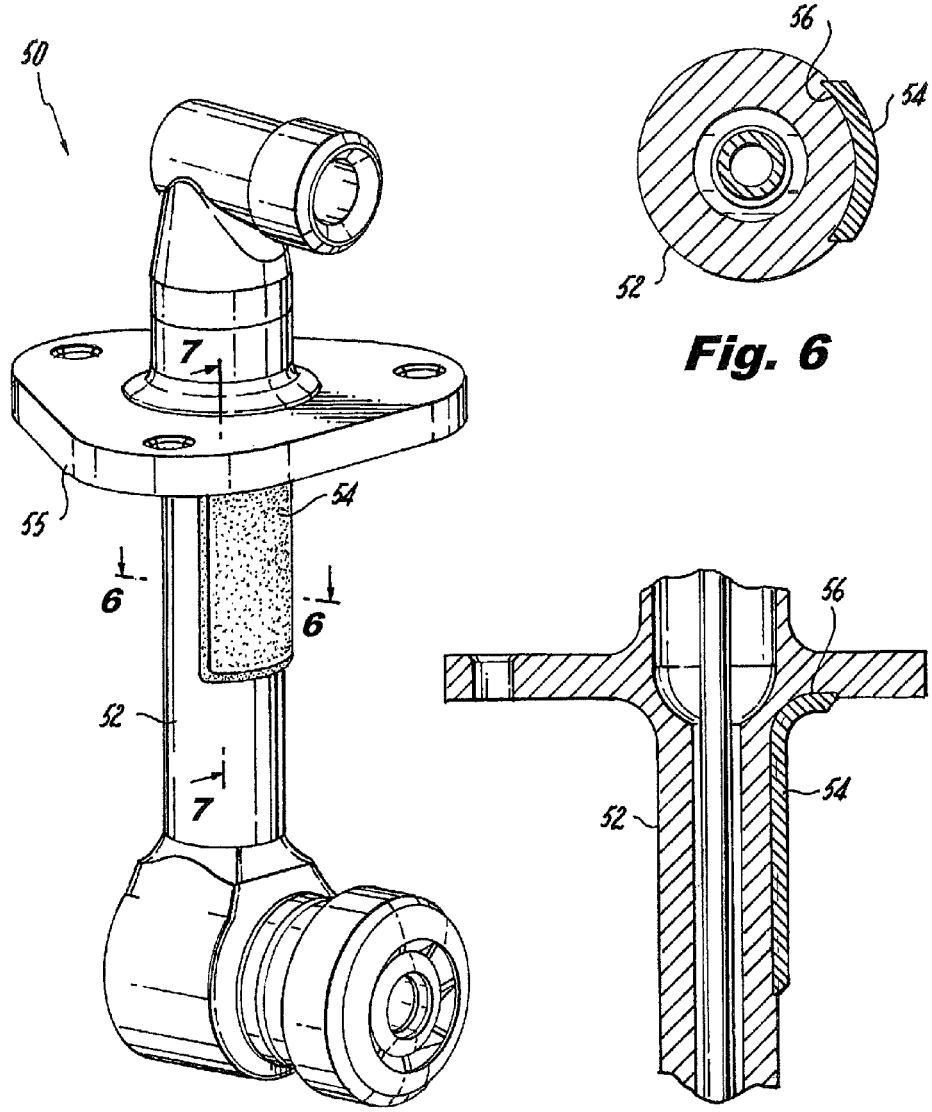
Fig. 5  Fig. 6  Fig. 7

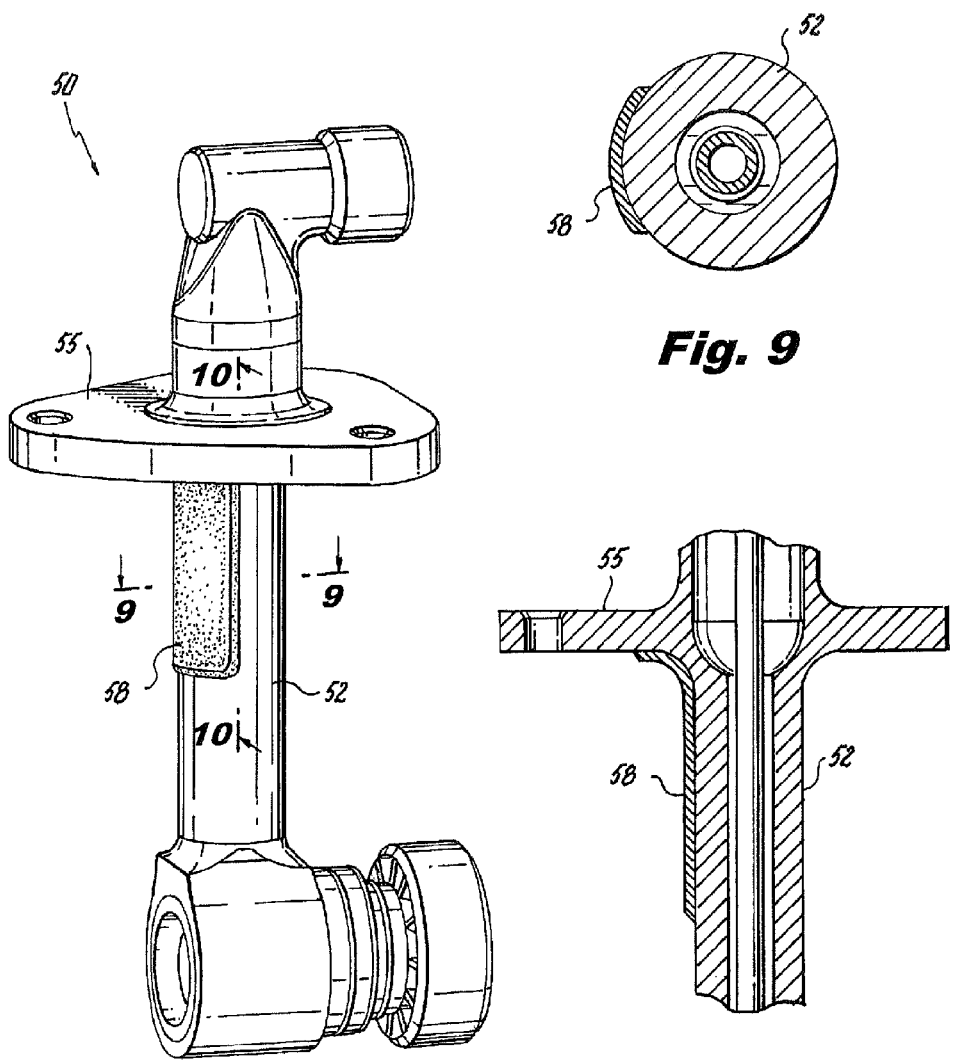

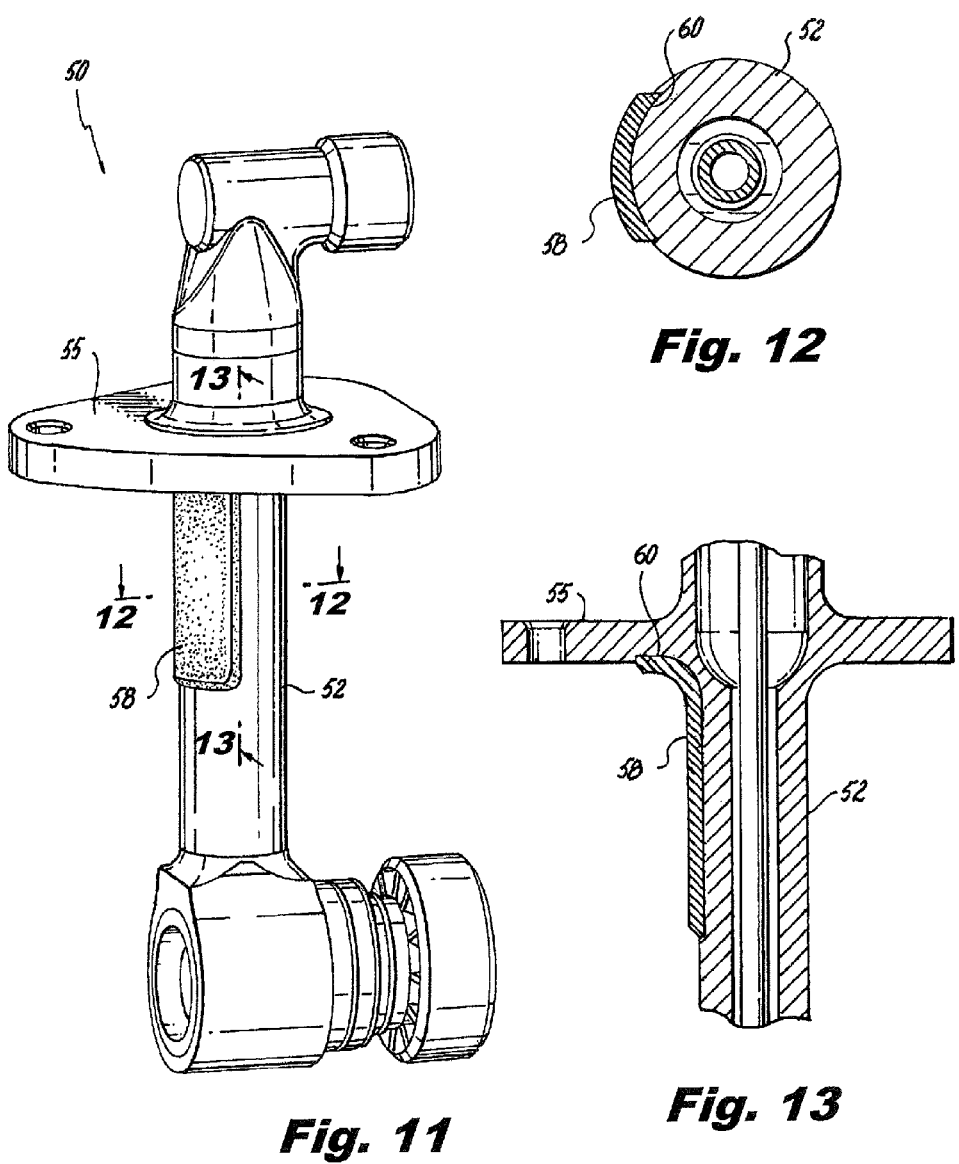

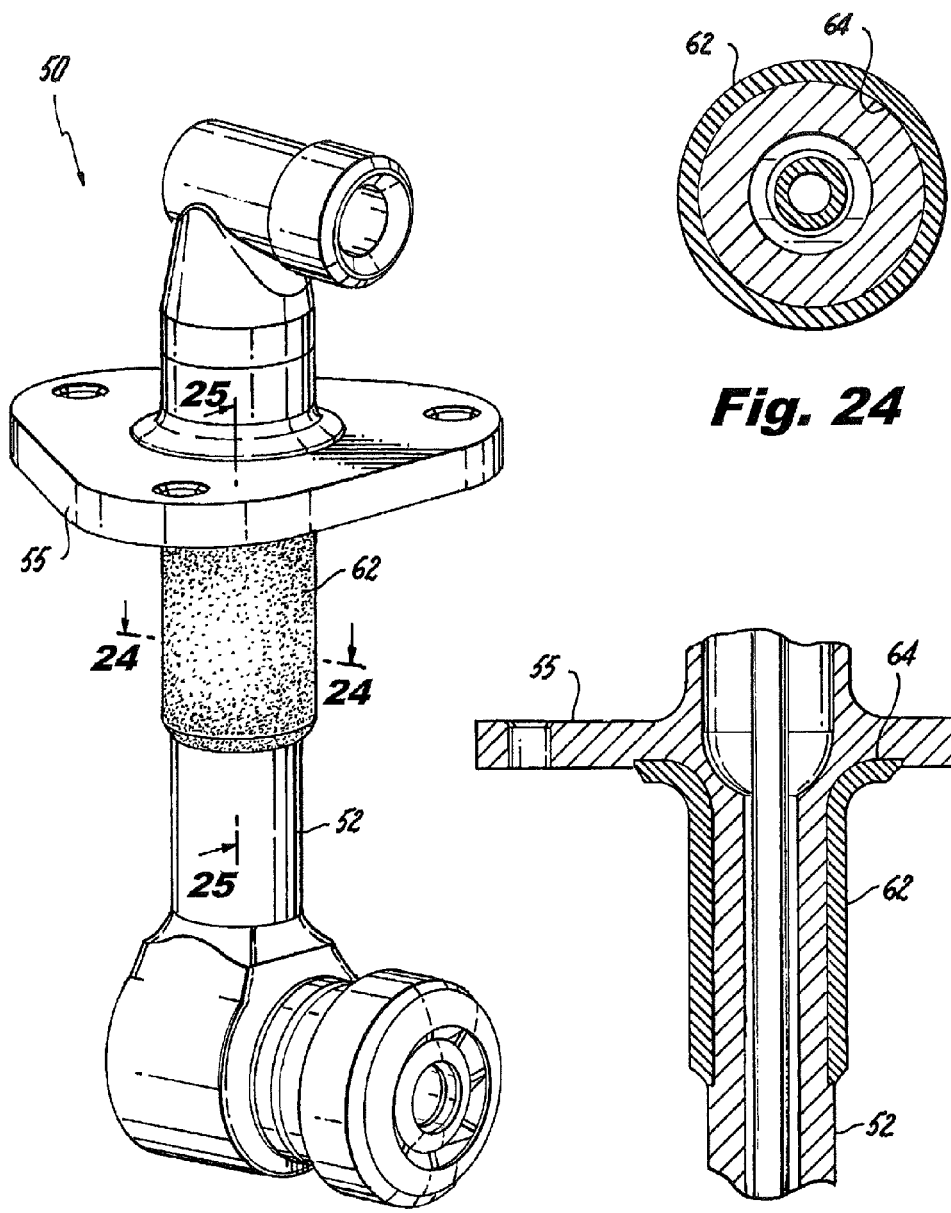
Fig. 23  Fig. 24  Fig. 25

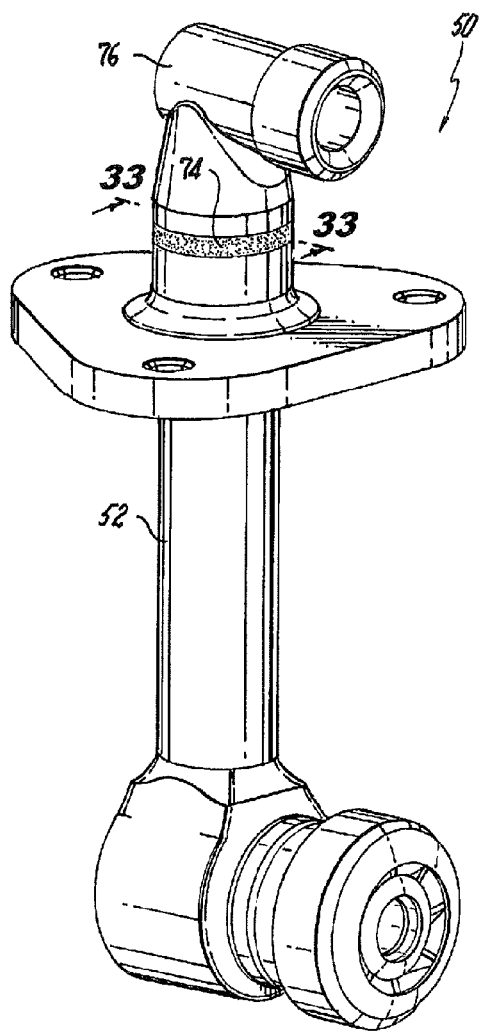
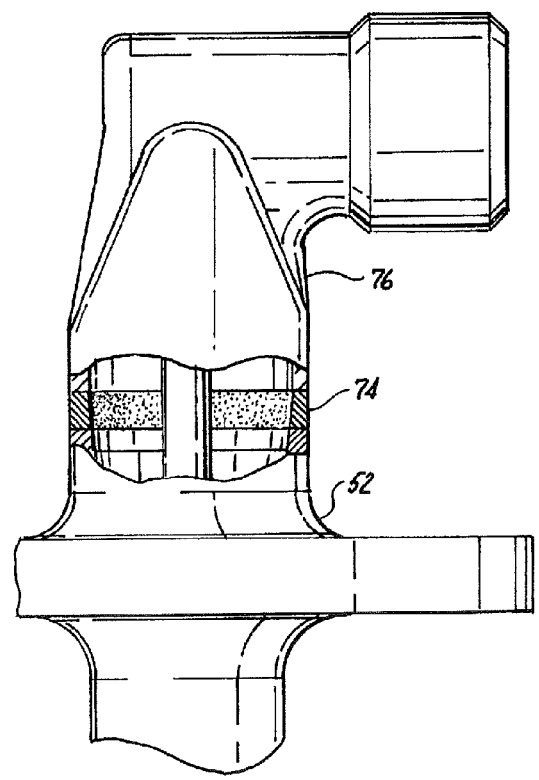
Fig. 32
Fig. 33

METHODS OF FABRICATING FUEL INJECTORS USING LASER ADDITIVE DEPOSITION

BACKGROUND OF THE INVENTION

1. Field of the Invention

The subject invention relates to the fabrication and assembly of fuel injectors for gas turbine engines, and more particularly, to methods of fabricating and assembling fuel injectors using laser additive deposition techniques to locally enhance the mechanical properties of the fuel injector.

2. Background of the Related Art

Gas turbines engines used in military and commercial aircraft must satisfy high demands with respect to reliability, weight, performance, economic efficiency and durability. Among other things, the use of advanced manufacturing methods and materials selection play a decisive role in meeting these requirements.

Conventional methods for manufacturing gas turbine components include forging and investment casting. For example, the highly stressed components in the compressor region of a gas turbine are typically manufactured by forging, whereas the rotor and stator blades of the turbine are typically manufactured by investment casting.

Another known method of manufacturing, repairing or restoring blades used in gas turbine engines is laser consolidation. In this process, a laser is used to create a melt pool at a metal surface during which metal or ceramic powder is delivered by a nozzle into the melt pool to build up a three dimensional geometry. Examples of this process are disclosed in U.S. Pat. No. 6,269,540 to Islam et al. and U.S. Pat. No. 7,984,547 to Steinhardt.

Material selection for gas turbine components that are subjected to high mechanical loads, high vibration loads or high thermal loads is often based upon material limits being exceeded in localized regions of the component. Exceeding the material limits in a local region often causes the designer of the component to specify high-strength or otherwise exotic alloy materials for fabricating the entire component. The selection of an exotic material for the entire component tends to drive its cost up substantially.

It would be desirable to employ techniques used for laser consolidation of entire engine components to locally improve or otherwise tailor the mechanical properties of an engine component. In this regard, the subject invention provides for the use of laser cladding or additive manufacturing processes to locally improve the material properties of a gas turbine component, and more particularly, a fuel injector used within a gas turbine engine.

Thus, an improved material can be applied in areas where improved properties may be needed for strength, vibration or thermal management. By using an improved material in localized areas, a manufacturer can save cost and weight on the overall component design, while meeting the same certification or equal requirements provided for a standard component.

SUMMARY OF THE INVENTION

The subject invention is directed to a new and useful method of fabricating a fuel injector comprising the steps of forming or otherwise machining a structural portion of a fuel injector from an alloy having a first mechanical property, and then adding an alloy having a second mechanical property that is different from the first mechanical property on a surface area of the structural portion of the fuel injector to enhance the mechanical properties of the fuel injector.

More particularly, the subject invention is directed to a method of fabricating a fuel injector that includes the steps of forming a feed arm of a fuel injector from a relatively low strength alloy and then laser adding a relatively high strength alloy on a surface area of the feed arm corresponding to a location of high stress concentration to reduce manufacturing cost and enhance the mechanical properties of the fuel injector in that localized area.

The step of adding includes depositing material on a front surface area of the feed arm, on a rear surface area of the feed arm or on front and rear surface areas of the feed arm, to locally reinforce those regions of high stress, in order to meet bird strike requirements set by an engine manufacture.

The step of adding could also include depositing material in a recessed area formed in a front surface of the feed min, in a rear surface of the feed arm or in recessed areas formed in front and rear surfaces of the feed arm. This provides improved bonding and additional localized cladding thickness on the surfaces of the feed arm, to further enhance the mechanical properties of the fuel injector in those localized areas.

In accordance with another aspect of the subject invention, the method includes the step of depositing material on surfaces of a tip portion the feed arm adjacent the nozzle body of the fuel injector, or in recessed areas formed in surfaces of a tip portion of the feed arm adjacent the nozzle body, at locations of high stress concentration, in order to meet vibration requirements set by an engine manufacture.

The subject invention is also directed to a method of fabricating a fuel injector that includes the steps of forming or otherwise machining a structural portion of the fuel injector (e.g., a feed arm of the fuel injector) from an alloy having a first thermal expansion characteristic, and then adding an alloy having a second thermal expansion characteristic on an external surface area of the feed arm to produce compressive stress in a desired location. In one embodiment, the material is deposited on opposed lateral surfaces of the feed arm, and it can also be deposited in recessed area formed in opposed lateral surface of the feed arm to improve bonding and provide additional localized cladding thickness.

The subject invention is also directed to a method of assembling a fuel injector comprising the steps of producing a feed arm of a fuel injector from a first alloy that is relatively difficult to braze, adding a second alloy that is not as difficult to braze onto a surface of the feed arm as the first alloy, and forming a braze joint between an injector component and the feed arm at the added surface, to improve the fabricability of the fuel injector. Preferably, the step of forming a braze joint includes joining a nozzle component to an interior surface of the feed arm.

The subject invention is also directed to a method of assembling a fuel injector comprising the steps of producing or otherwise machining a feed arm of a fuel injector from a first alloy that is relatively difficult to weld, adding a second alloy that is not as difficult to weld onto a surface of the feed arm as the first alloy, and forming a weld joint between an injector component and the feed arm at the added surface, to improve the fabricability of the fuel injector. Preferably, the step of forming a weld joint includes joining an inlet fitting onto an upper portion of the feed arm.

The subject invention is further directed to a method of fabricating a fuel injector component comprising the steps of machining an outer air swirler of a nozzle body from a first alloy, and subsequently forming a diverging air cap on the outer air swirler from a second alloy that is more resistant to high temperatures than the first alloy, by laser additive deposition.

These and other aspects of the subject invention, including steps for hardening injector component surfaces by adding high hardness material on to softer base materials to strengthen threads and provide effective metal to metal seals will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to employ the methods disclosed herein, aspects and embodiments thereof will be described in detail hereinbelow with reference to the drawings, wherein:

FIG. 5 is a perspective view of a fuel injector wherein the feed arm is made from a relatively low strength alloy and a relatively high strength alloy is deposited into a recess formed in a front surface area thereof using laser additive deposition to further enhance the mechanical properties of the fuel injector;

FIG. 6 is a cross-sectional view of the feed arm taken along line 6-6 of FIG. 5;

FIG. 7 is a cross-sectional view of the feed arm taken along line 7-7 of FIG. 5;

FIG. 8 is a perspective view of a fuel injector wherein the feed aim is made from a relatively low strength alloy and a relatively high strength alloy is deposited onto a rear surface area thereof using laser additive deposition to locally enhance the mechanical properties of the fuel injector;

FIG. 9 is a cross-sectional view of the feed arm taken along line 9-9 of FIG. 8;

FIG. 10 is a cross-sectional view of the feed arm taken along line 10-10 of FIG. 8;

FIG. 11 is a perspective view of a fuel injector wherein the feed arm is made from a relatively low strength alloy and a relatively high strength alloy is deposited into a recess formed in a rear surface area thereof using laser additive deposition to further enhance the mechanical properties of the fuel injector;

FIG. 12 is a cross-sectional view of the feed arm taken along line 12-12 of FIG. 11;

FIG. 13 is a cross-sectional view of the feed arm taken along line 13-13 of FIG. 11;

FIG. 23 is a perspective view of a fuel injector wherein the feed arm is made from a relatively low strength alloy and a relatively high strength alloy is deposited in a circumferential recessed area formed therein using laser additive deposition to further enhance the mechanical properties of the fuel injector;

FIG. 24 is a cross-sectional view of the feed arm taken along line 24-24 of FIG. 23;

FIG. 25 is a cross-sectional view of the feed arm taken along line 25-25 of FIG. 23;

FIG. 32 is a perspective view a fuel injector having a feed arm machined from a first alloy that is difficult to weld, which includes a weld joint formed by adding a second alloy that is not as difficult to weld as the first alloy onto a surface of the feed arm to improve the fabricability of the fuel injector;

FIG. 33 is a cross-sectional view taken along line 33-33 of FIG. 32 showing the added weld joint;

DETAILED DESCRIPTION OF THE PREFERRED EMBODIMENTS

Figure 1:
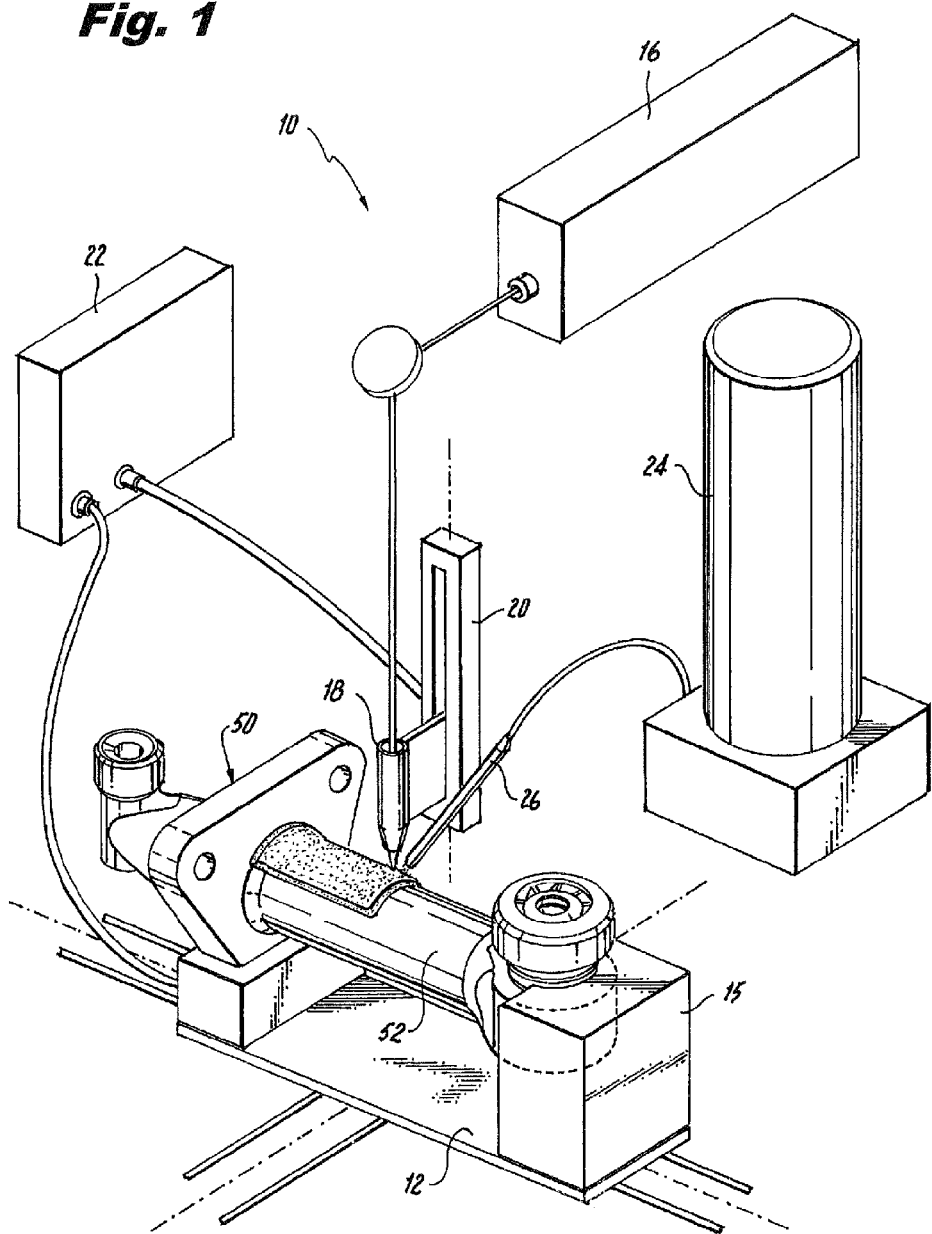
FIG. 1 is a schematic representation of a system for fabricating engine components using an additive manufacturing process, wherein a fuel injector is shown supported on a stage while undergoing laser additive deposition in accordance with a preferred embodiment of the subject invention.

Referring now to the drawings wherein like reference numerals identify similar structural features or aspects of the subject invention, there is illustrated in FIG. 1 a schematic representation of a system for fabricating engine components using an additive manufacturing process, which is designated generally by reference numeral 10. Those skilled in the art will readily appreciate that the term additive manufacturing process, as used herein, encompasses techniques such as laser additive deposition, laser metal deposition, direct laser deposition, direct metal deposition, laser cladding and the like.

System 10, which is typically housed within a sealed working chamber (not shown), includes a CNC motion controlled two axis stage 12 with a cradle 15 for supporting a work piece 50. In this instance, the work piece 50 is in the form of a fuel injector used to deliver fuel and air into the combustion chamber of a gas turbine engine. Those skilled in the art will readily appreciate that this is merely just an example of an engine component that can be fabricated in accordance with the methods described herein. Moreover, the following descriptions and accompanying illustrations of fuel injectors are not intended to limit the subject disclosure in any way. Indeed, other engine components can be readily fabricated using the novel methods disclosed herein.

The two axis stage 12 is adapted and configured to translate the work piece 50 in relative X and Y planes during the additive deposition process. The system 10 further includes a laser 16 that includes focusing optics 18 supported on a CNC motion controlled vertical stage 20 mounted for movement in a Z plane relative the two axis stage 12. It is envisioned that a five-axis motion system can also be employed, which would include a two-axis (X-Y) motion bed, a two-axis (B-C) tool orientation head that angles and rotates the work piece, and a fifth axis (Z) for moving the focusing optics of the laser.

A suitable laser for use with the system 10 would be a Nd:YAG laser (500 W or 1000 W), or an equivalent thereof. It is envisioned that a 500 W pulse laser or a 4 kW continuous laser can be employed with the system disclosed herein.

A computer guided motion controller 22 controls the movement of the two axis stage 12 supporting the work piece 50 and the vertical stage 20 supporting the laser optics 18 in accordance with a set of instructions relating to the production of a desired structural feature. System 10 also includes a powder feeder 24 which delivers metallic powder to a nozzle 26. The interaction of powdered metal from the nozzle 26 and the laser 16/18 causes melting to occur, and is commonly referred to as the melt pool. This is deposited onto a surface of the work piece 50. Moving the work piece 50 upon stage 12 allows the melt pool to solidify and thus produces a track of solid metal in a desired location, as illustrated in FIG. 1.

The laser additive deposition process of the subject invention is particularly useful for locally improving the metallurgical properties of an engine component in selected regions where it is most needed and only in those regions. For example, in cases where an engine manufacturer sets bird strike requirements for a fuel injector, the designer of that engine component must typically manufacture the entire feed arm of the injector from expensive high-strength, corrosion resistant super alloys such as, for example, nickel-chromium based Inconel® alloy 718 or nickel-based Waspaloy.

However, employing the additive deposition process of the subject invention, the feed arm of the fuel injector is advantageously fabricated from a less expensive and relatively lower strength alloy, such as Hastelloy® X alloy, which is a nickel-chromium-iron-molybdenum alloy that possesses exceptional forming and welding characteristics. A layer of Inconel® alloy 718 or Waspaloy is then deposited onto a specified surface area of the Hastelloy® X alloy feed arm by laser additive deposition, to mechanically reinforce only the locally stressed region(s) of the feed arm, and thereby meet the bird strike requirements set by the engine manufacturer in a more cost effective manner.

Figures 2, 3, 4:
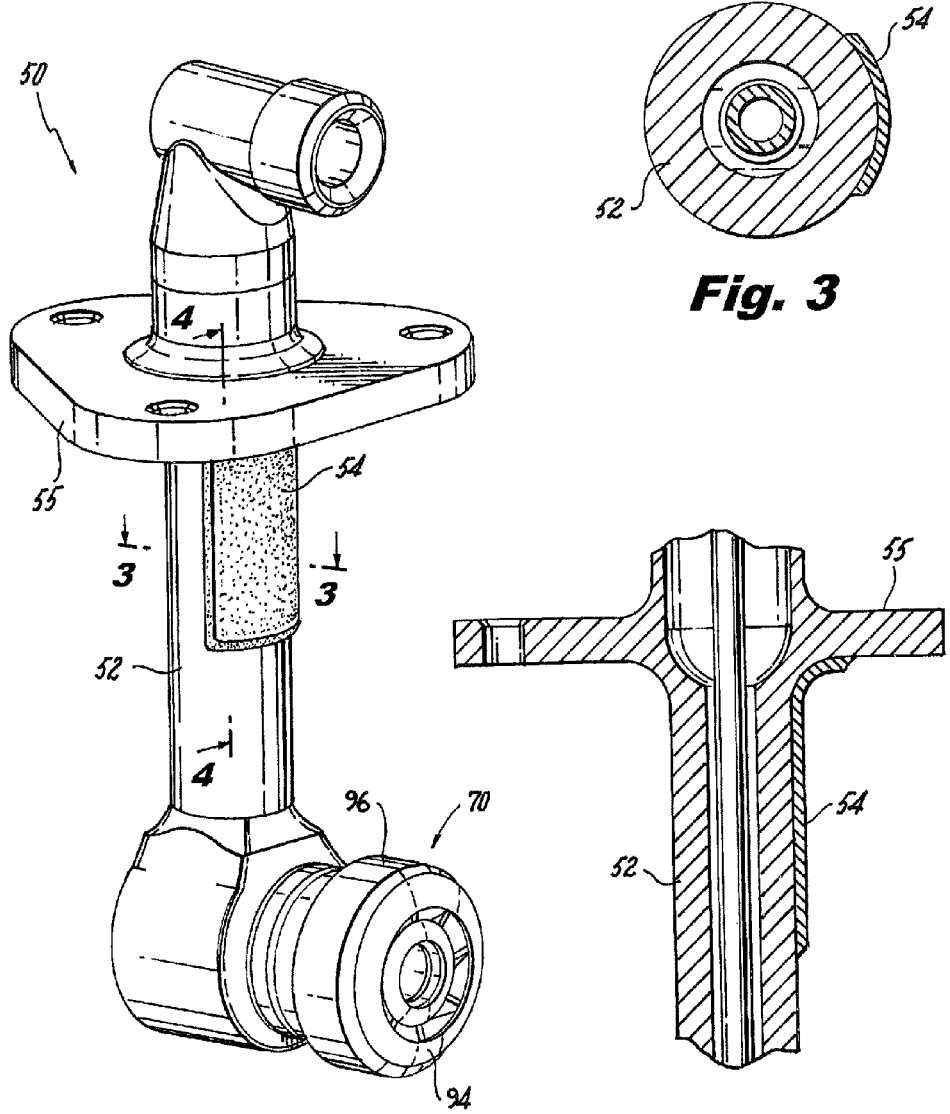
FIG. 2 is a perspective view of a fuel injector wherein the feed arm is made from a relatively low strength alloy and a relatively high strength alloy is deposited onto a front surface area thereof using laser additive deposition to locally enhance the mechanical properties of the fuel injector.
FIG. 3 is a cross-sectional view of the feed arm taken along line 3-3 of FIG. 2.
FIG. 4 is a cross-sectional view of the feed arm taken along line 4-4 of FIG. 2.

A fuel injector fabricated in accordance with this method is illustrated for example in FIGS. 2-4. More particularly, the feed arm 52 of fuel injector 50 is made from a relatively low-strength alloy such as, for example, Hastelloy® X alloy, and a relatively high-strength alloy, such as, for example, Inconel® alloy 718 or Waspaloy, is deposited onto a front surface area 54 of the feed arm 52 adjacent the mounting flange 55 using laser additive deposition, to enhance the mechanical properties of the fuel injector 50 in that localized area, and only that area, and thereby meet bird strike requirements.

In an alternative embodiment of the invention shown in FIGS. 5-7, the feed arm 52 of fuel injector 50 is made from a relatively low strength alloy (e.g., Hastelloy® X alloy) and a relatively high strength alloy (e.g., Inconel® alloy 718 or Waspaloy) is deposited into a recess 56 formed in a front surface area 54 of the feed arm 52 adjacent the mounting flange 55 using laser additive deposition. This provides improved bonding and increased cladding thickness relative to the embodiment shown in FIGS. 2-4, to further enhance the mechanical properties of the fuel injector 50 in that localized area.

Referring to FIGS. 8-10, the feed arm 52 of fuel injector 50 is made from a relatively low strength alloy (e.g., Hastelloy® X alloy) and a relatively high strength alloy (e.g., Inconel® alloy 718 or Waspaloy) is deposited onto a rear surface area 58 of the feed arm 52 adjacent the mounting flange 55 using laser additive deposition to enhance the mechanical properties of the fuel injector 50 in that localized area. Alternatively, as shown in FIGS. 11-13, the relatively high strength alloy is deposited into a recess 60 formed in a rear surface area 58 of the feed arm 52 to further enhance the mechanical properties of the fuel injector 50 in that localized area.

Figures 14, 15, 16:
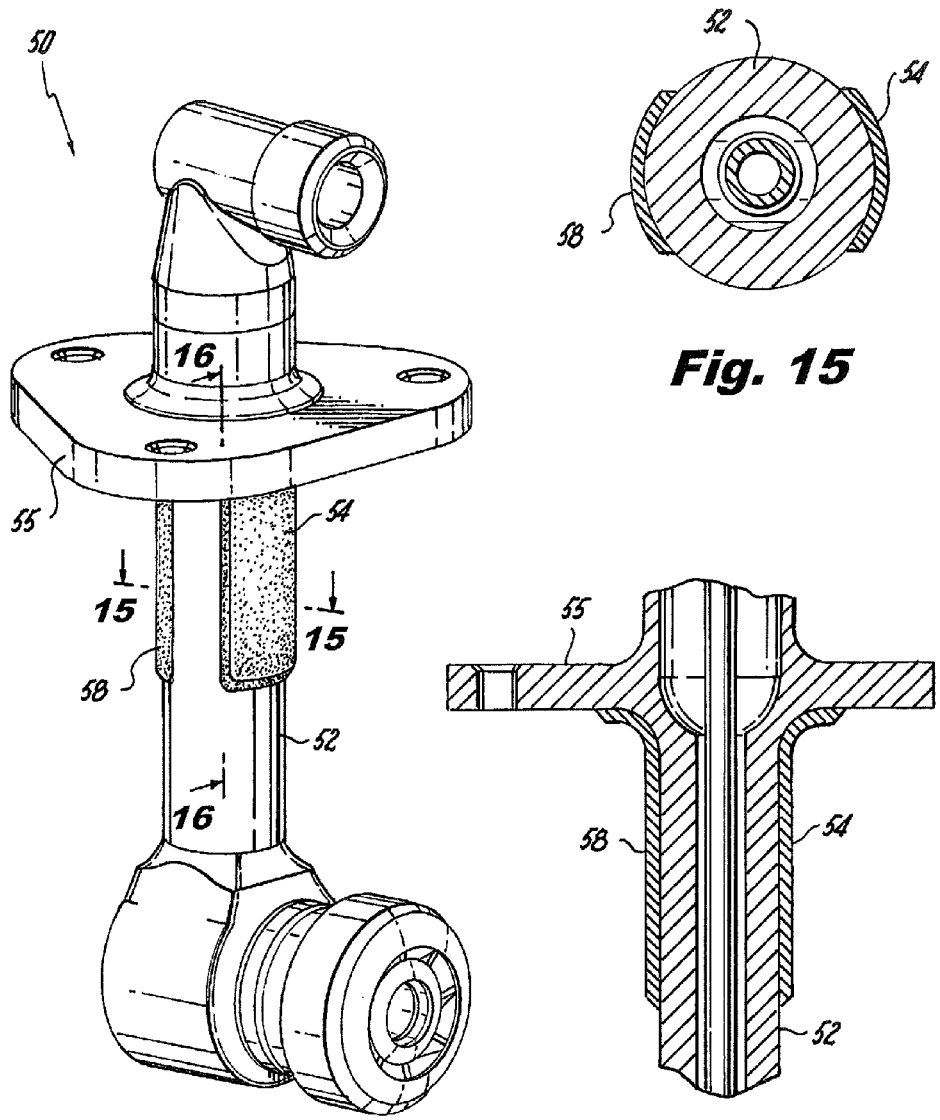
FIG. 14 is a perspective view of a fuel injector wherein the feed arm is made from a relatively low strength alloy and a relatively high strength alloy is deposited onto front and rear surface areas thereof using laser additive deposition to locally enhance the mechanical properties of the fuel injector.
FIG. 15 is a cross-sectional view of the feed arm taken along line 15-15 of FIG. 14.
FIG. 16 is a cross-sectional view of the feed arm taken along line 16-16 of FIG. 14.
Figures 17, 18, 19:
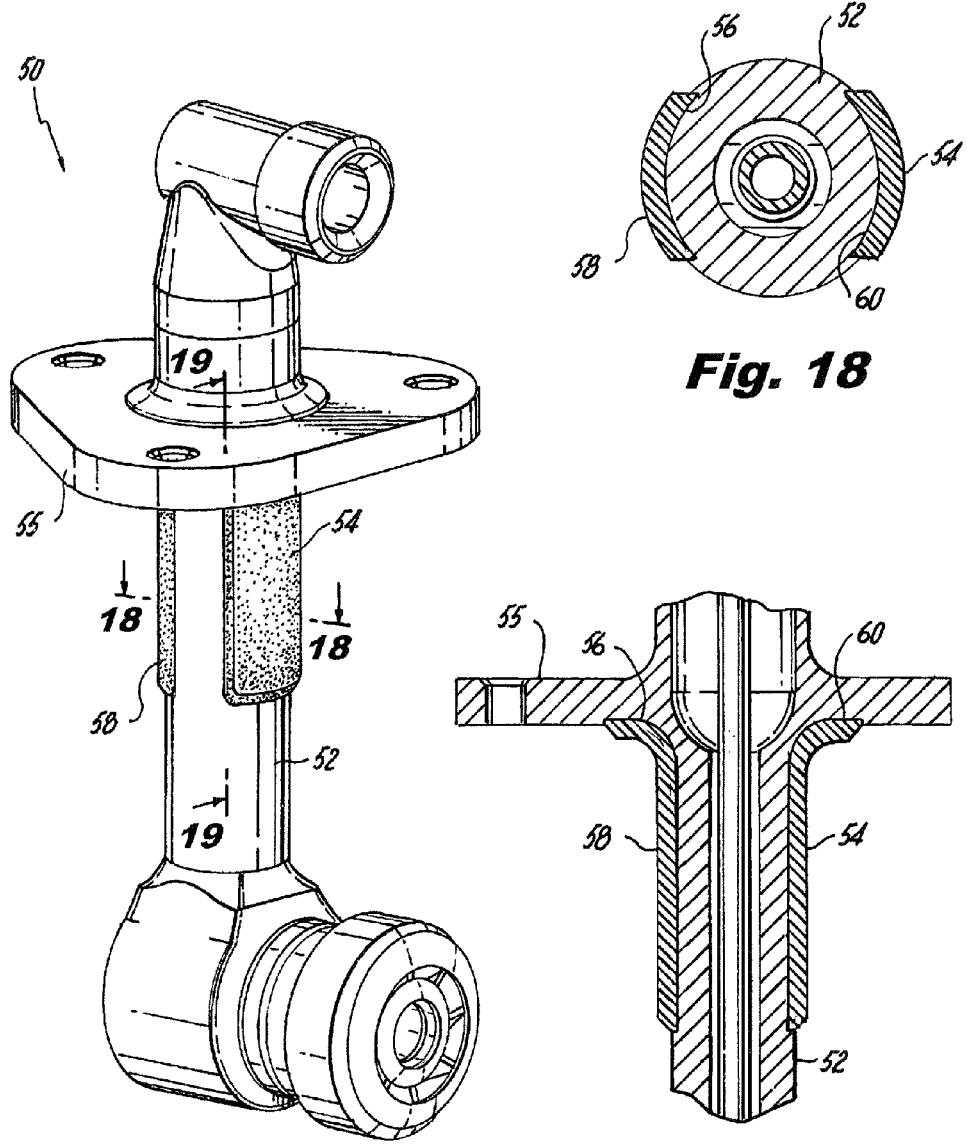
FIG. 17 is a perspective view of a fuel injector wherein the feed arm is made from a relatively low strength alloy and a relatively high strength alloy is deposited into recesses formed in front and rear surface areas thereof using laser additive deposition to further enhance the mechanical properties of the fuel injector.
FIG. 18 is a cross-sectional view of the feed arm taken along line 18-18 of FIG. 17.
FIG. 19 is a cross-sectional view of the feed arm taken along line 19-19 of FIG. 17.

Referring to FIGS. 14-16, the feed arm 52 of fuel injector 50 made from a relatively low strength alloy (e.g., Hastelloy® X alloy) and a relatively high strength alloy (e.g., Inconel® alloy 718 or Waspaloy) is deposited onto the front and rear surface areas 54 and 58 of the feed arm 52 adjacent the mounting flange 55 using laser additive deposition to enhance the mechanical properties of the fuel injector 50 only in those localized areas. In an alternative embodiment shown in FIGS. 17-19, the relatively high strength alloy is deposited into recesses 56 and 60 formed in the front and rear surface areas 54 and 58 of feed arm 52 using laser additive deposition to further enhance the mechanical properties of the fuel injector 50 only in those localized areas.

Figures 20, 21, 22:
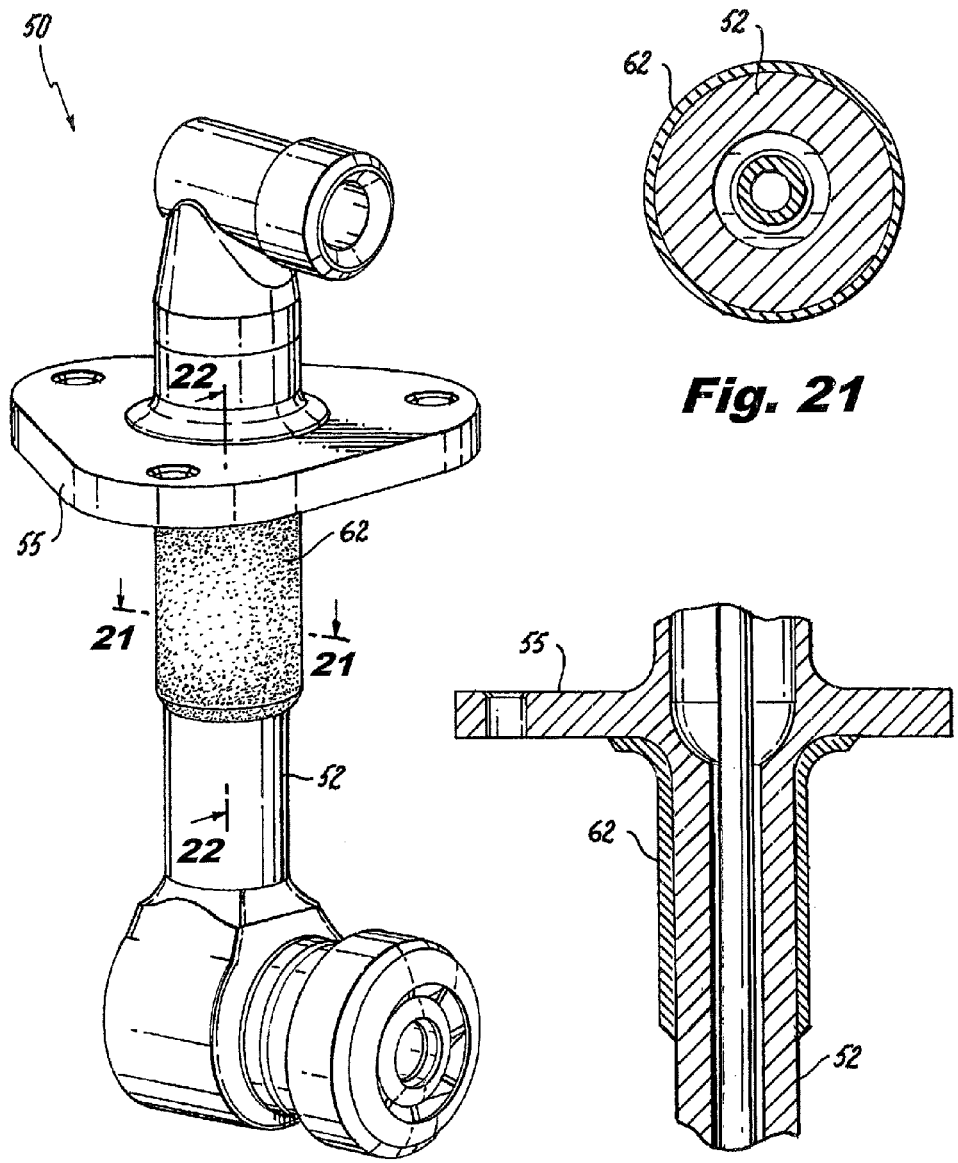
FIG. 20 is a perspective view of a fuel injector wherein the feed arm is made from a relatively low strength alloy and a relatively high strength alloy is deposited on a circumferential surface area thereof using laser additive deposition to locally enhance the mechanical properties of the fuel injector.
FIG. 21 is a cross-sectional view of the feed arm taken along line 21-21 of FIG. 20.
FIG. 22 is a cross-sectional view of the feed arm taken along line 22-22 of FIG. 20.

Referring to FIGS. 20-22, the feed arm 52 of fuel injector 50 is made from a relatively low strength alloy (e.g., Hastelloy® X alloy) and a relatively high strength alloy (e.g., Inconel® alloy 718 or Waspaloy) is deposited on a circumferential surface area 62 of the feed arm 52 adjacent the mounting flange 55 using laser additive deposition to enhance the mechanical properties of the fuel injector 50 only in that area feed arm. In another embodiment of the subject invention, the relatively high strength alloy is deposited in a circumferential recessed area 64 formed therein using laser additive deposition, to further enhance the mechanical properties of the fuel injector 50 only in that area of the feed arm.

The additive deposition process of the subject invention can also be used to meet vibration requirements set by engine manufacturers. In this regard, local patches of relatively high strength alloy are additively deposited onto a feed arm fabricated from a relatively low-cost, low strength alloy, based upon the identification of highly stressed regions of that component. These stressed regions are predicted through vibration analysis performed by the component designer.

Figure 26:
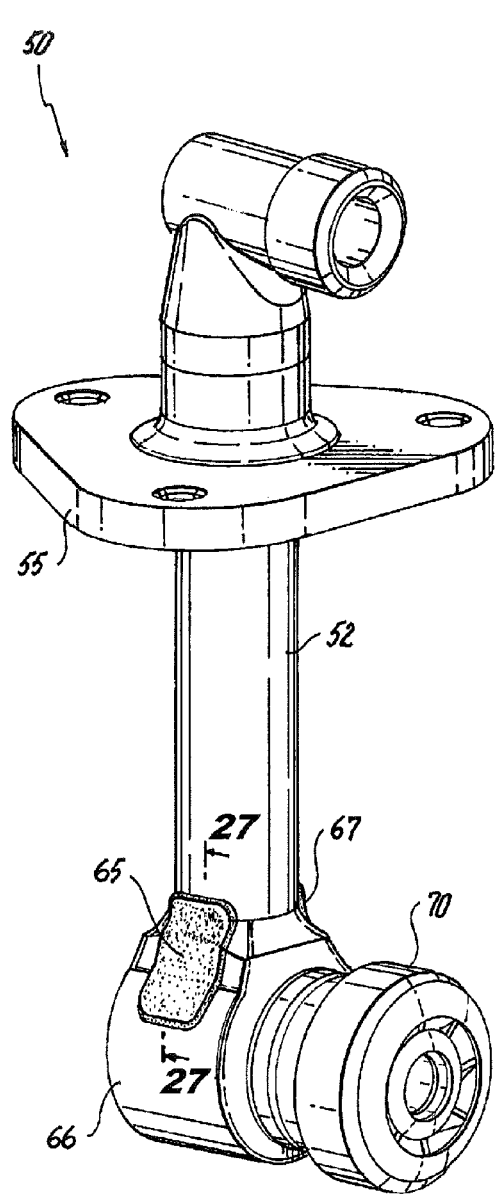
FIG. 26 is a perspective view of a fuel injector wherein the feed arm is made from a relatively low strength alloy and a relatively high strength alloy is deposited on lateral surfaces of a tip portion the feed arm to meet vibration requirements set by an engine manufacturer.
Figure 27:
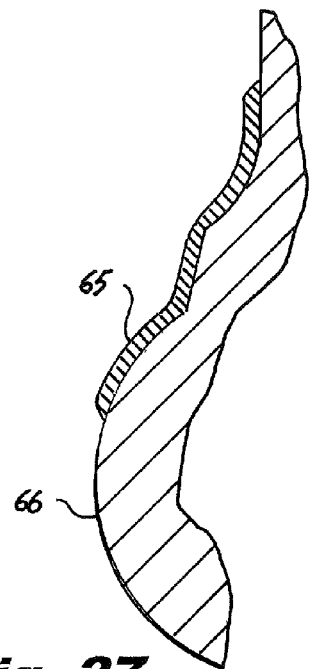
FIG. 27 is a cross-sectional view of the tip portion of the feed arm taken along line 27-27 of FIG. 26.
Figure 28:
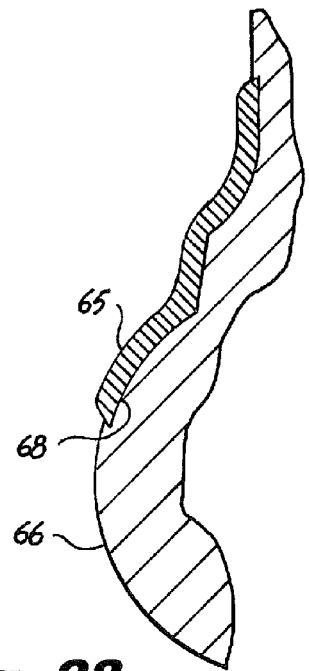
FIG. 28 is a cross-sectional view of the tip portion of the feed arm taken along line 27-27 of FIG. 26, wherein the high strength alloy is deposited in a recessed area of a tip portion the feed arm to further enhance the mechanical properties of the fuel injector.

An example of an engine component fabricated in this manner is shown in FIGS. 26 and 27, wherein the feed arm 52 of fuel injector 50 is made from a relatively low strength alloy, such as Hastelloy® X alloy. A relatively high strength alloy such as Inconel® alloy 718 or Waspaloy is deposited by laser additive deposition on highly stressed lateral surfaces 65 and 67 at or near the tip portion 66 the feed arm 52, adjacent the nozzle body 70, to meet a manufacturer's vibration requirements for the fuel injector. As shown in FIG. 28, the high strength alloy can also be deposited in a recessed area 68 at the tip portion 66 feed arm 52 to improve bonding and increase cladding thickness.

The laser additive deposition process of the subject invention is also used to locally improve the processing properties of an engine component in regions where it is most needed and only in those regions. In this regard, many high strength materials are heavily alloyed, which can be good for component life but can be bad for special material processing steps such as brazing. For example, the additive deposition process of the subject invention can be advantageously used to provide a local inert surface that is intended to be half of a braze joint.

Figure 29:
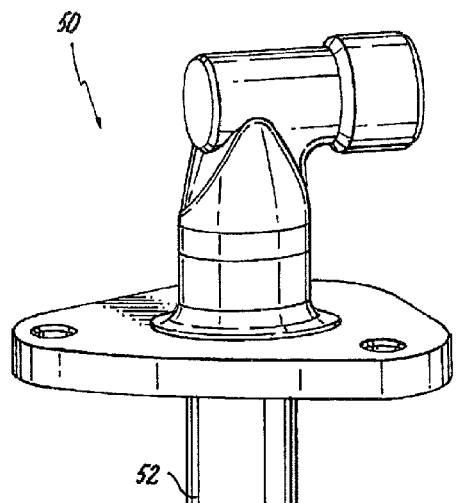
FIG. 29 is a perspective view of a fuel injector having a feed arm machined from a first alloy that is difficult to braze.
Figure 30:
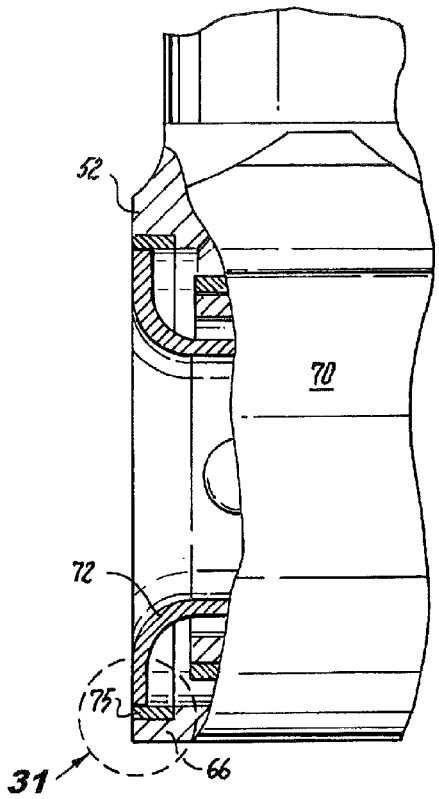
FIG. 30 is an enlarged cross-sectional view of a proximal portion of the nozzle body at the end of the feed arm of the fuel injector shown in FIG. 29, wherein an alloy that is not as difficult to braze as the first alloy is deposited onto an interior surface of the feed arm to form a braze joint between an injector component of the nozzle body and the feed arm to improve the fabricability of the fuel injector.
Figure 31:
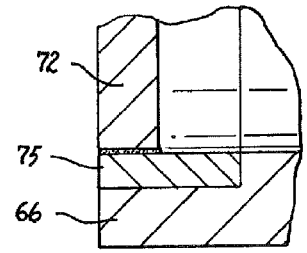
FIG. 31 is an enlarged localized view of the braze joint shown in FIG. 30.

Referring to FIG. 29, fuel injector 50 has a feed arm 52 fabricated from an alloy that is difficult to braze, such as, for example, Inconel® alloy 718. In accordance with the subject invention, Hastelloy® X alloy or a stabilized stainless steel alloy such as 347 Stainless Steel is deposited by laser additive deposition onto a surface of the feed arm 52 to form a braze surface joint 75. More particularly, as best seen in FIG. 30, there is a nozzle body 70 at the end of the tip portion 66 the feed arm 52. Here, an alloy that is not difficult to braze (e.g., Hastelloy® X alloy) is deposited onto an interior surface of the tip portion 66 of the feed arm 52 formed from Inconel® alloy 718 to form a braze joint 75 between an injector component 72 of the nozzle body 70 and the feed arm 52, which is best seen in FIG. 31.

The laser additive deposition process of the subject invention is also used to provide a local inert region that is intended to be half of a weld joint that joins two complementary parts of an engine component together. For example, a material such as Hastelloy® X alloy or Inconel® 625 alloy, which are both easily weldable, is deposited by laser additive deposition onto a surface of a high temperature, high strength alloy component made from Inconel® 718 or Waspaloy, just at the weld joint region. The two components are then welded together. This eliminates the need for post weld heat treatment when the component is fabricated only from Inconel® 718 or Waspaloy.

Referring to FIGS. 32 and 33, fuel injector 50 has a feed arm 52 and inlet fitting 76 are machined from an alloy that is relatively difficult to weld (e.g., Inconel® 718 or Waspaloy). A weld joint 74 is formed by adding an alloy that is not difficult to weld (e.g., Hastelloy® X alloy or Inconel® 625 alloy) onto a surface of the feed arm 52 to join an inlet fitting 76 to the feed arm 52.

The laser additive deposition process of the subject invention is also used to provide a preload characteristic to an engine component. In this regard, an alloy with a particular thermal expansion characteristic is additively deposited on the external surface(s) of a feed arm fabricated from an alloy having a different thermal expansion characteristic. The difference in thermal expansion characteristics of the alloys results in the formation of stress in the feed arm, which advantageously produces compressive stress in critical or desired locations of the component.

Figure 34:
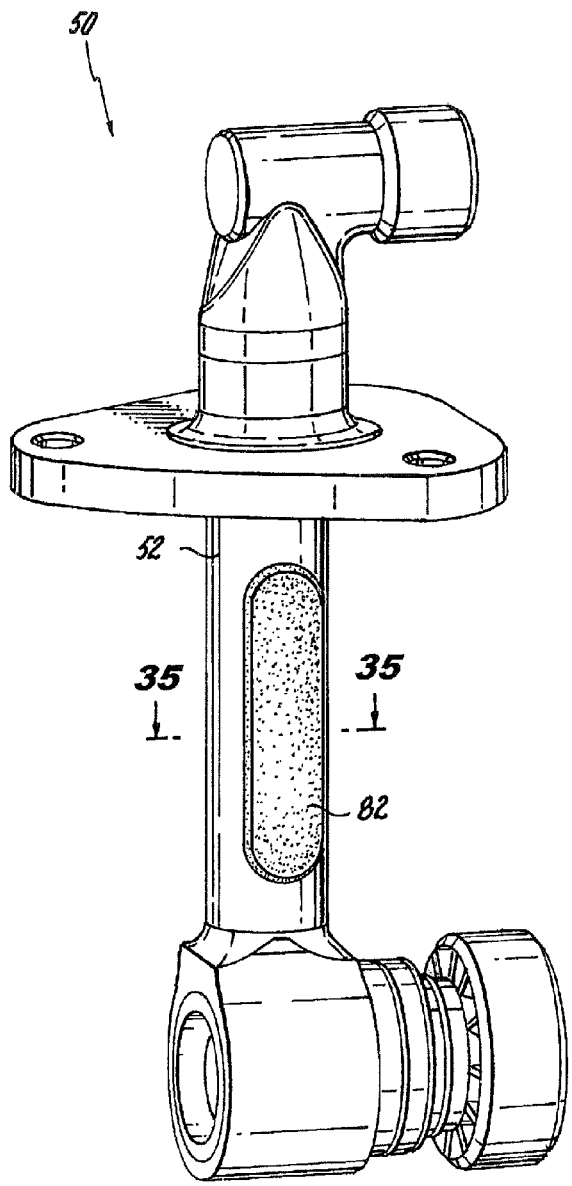
FIG. 34 is a perspective view of a fuel injector wherein the feed arm machined from an alloy having a first thermal expansion characteristic, wherein an alloy having a second thermal expansion characteristic that is different from that of the first alloy is deposited onto external surface areas of the feed arm to produce compressive stress in desired locations.
Figure 35:
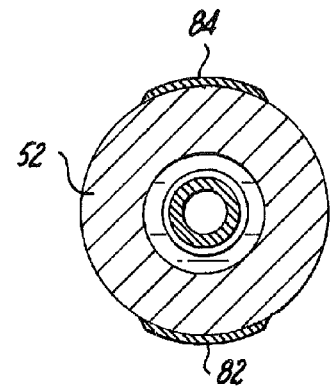
FIG. 35 is a cross-sectional view taken along line 35-35 of FIG. 34, wherein the alloy is deposited in areas on lateral sides of the feed arm.
Figure 36:
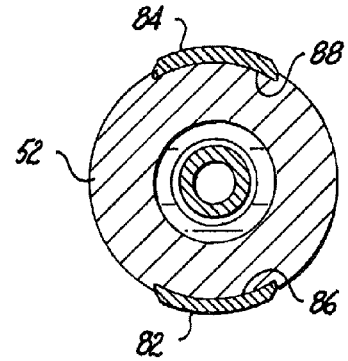
FIG. 36 is a cross-sectional view taken along line 35-35 of FIG. 34, wherein the alloy is deposited in recessed areas formed in lateral sides of the feed arm.

An example of this embodiment of the subject invention is shown in FIGS. 34-35, wherein feed arm 52 of fuel injector 50 is machined from an alloy having a first thermal expansion characteristic (e.g., 347 Stainless Steel alloy). An alloy having a second thermal expansion characteristic (e.g., Inconel®625 alloy) is deposited onto external lateral side surface areas 82 and 84 of feed arm 52 to produce compressive stress in those two desired locations. Alternatively, as shown in FIG. 36, the Inconel® 625 alloy is deposited in recessed areas 86 and 88 formed in lateral sides of the feed arm 52. The difference in thermal expansion between the two dissimilar alloys creates compressive stress in the feed arm 52 made from 347 Stainless Steel, improving the fatigue properties, and tensile stress in the Inconel® 625 alloy, which would only slightly reduce its fatigue properties. This would be an acceptable tradeoff, because the baseline fatigue properties of Inconel 625 alloy are relatively better than 347 Stainless Steel.

Figure 37:
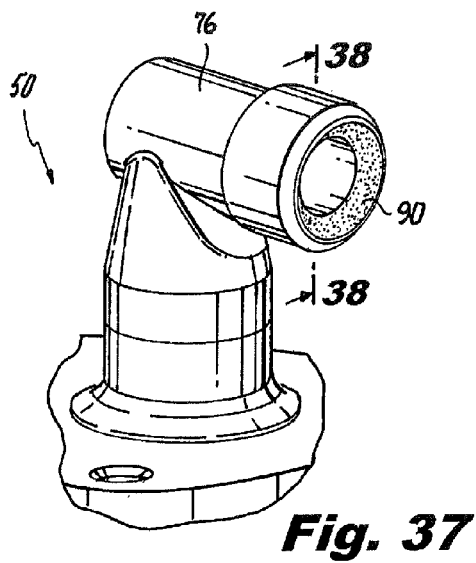
FIG. 37 is a perspective view of an inlet fitting of a fuel injector made from a relatively low hardness alloy, wherein interior sealing surfaces of the inlet fitting are formed from a relatively high hardness alloy by laser additive deposition.
Figure 38:
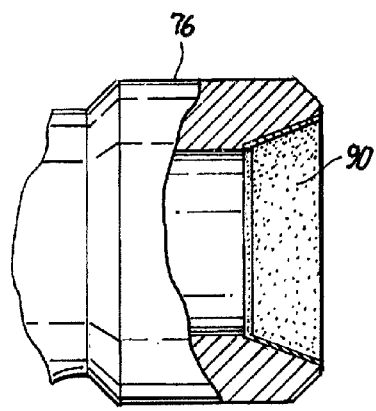
FIG. 38 is a partial cross-sectional view taken along line 38-38 of FIG. 37.

Those skilled in the art will readily appreciate that the laser cladding process of the subject invention can also be used to protect known wear surfaces on engine components. For example, FIGS. 37-38 show the inlet fitting 76 of fuel injector 50 made from a relatively low hardness alloy, and an interior sealing surface 90 of the inlet fitting 76 is formed by depositing a relatively high hardness alloy onto that surface by laser additive deposition. By additively depositing a high hardness alloy onto a softer base material to form a metal to metal seal of this nature, the relatively high hardness alloy provides the sealing surface, while a material that has good manufacturability is used for the remainder of the component.

Figure 39:
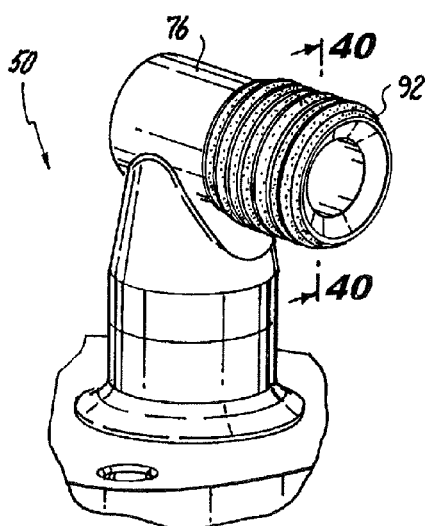
FIG. 39 is a perspective view of an inlet fitting of a fuel injector made from a relatively low hardness alloy, wherein threaded surfaces of the inlet fitting are formed from a relatively high hardness alloy by laser additive deposition.
Figure 40:
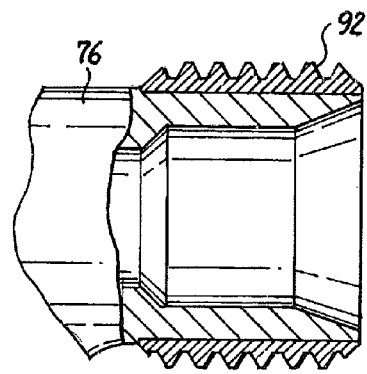
FIG. 40 is a partial cross-sectional view taken along line 40-40 of FIG. 39.

Similarly, FIGS. 39-40 show the inlet fitting 76 of fuel injector 50 made from a relatively low hardness alloy, and the threaded surfaces 92 of the inlet fitting 76 are formed from a relatively high hardness alloy by laser additive deposition.

The high hardness alloy provides thread strength, while the material with good manufacturability is used for the remainder of the component.

It is also envisioned that the laser additive deposition process of the subject invention can be used to fabricate portions of fuel injector components that are subjected to the high operating temperatures that exists within the combustion chamber of a gas turbine engine. For example, the converging outer air cap 94 of the nozzle body 70 shown in FIG. 2 can be fabricated using laser additive deposition.

Figure 41:
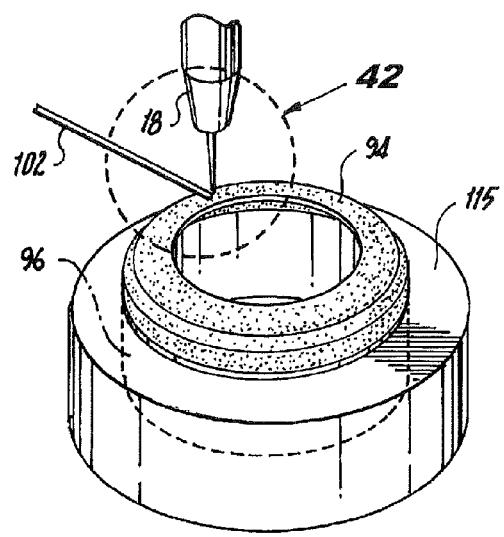
FIG. 41 illustrates a method for forming a diverging portion of an outer air cap of a nozzle body of a fuel injector using laser additive deposition, pursuant to the subject invention.
Figure 42:
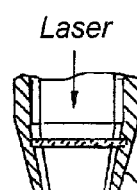
FIGS. 42-45 illustrate several different feeding systems that are available for performing laser additive deposition, as it relates to the method of forming an air cap shown in FIG. 41.

In this regard, as shown in FIGS. 41-42, the air cap 94 is additively formed on top of the pre-existing outer air swirler 96, which is supported within a cradle 115 adjacent a metallic cladding wire 102 and laser optics 18. Preferably, the air cap 94 is additively formed from an alloy that is more resistant to high engine operating temperatures than the alloy from which the air swirler 96 is formed. For example, the air swirler 96 can be fabricated from Hastelloy® X alloy and the converging air cap 94 can be formed by depositing Haynes 230 or Haynes 214 onto the air swirler 96.

Figure 43:
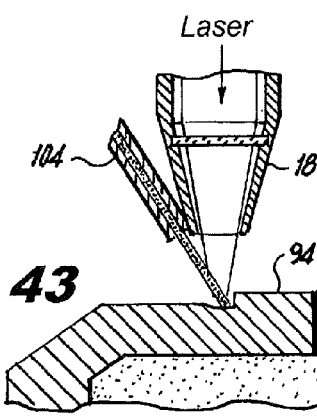
Figure 44:
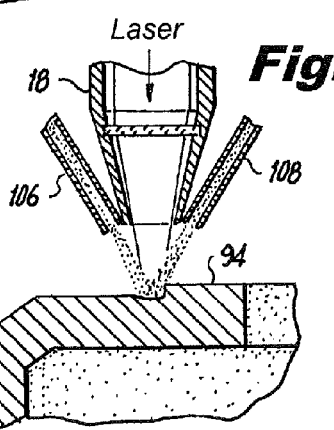
Figure 45:
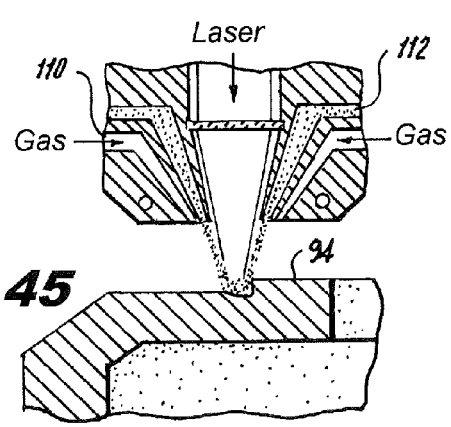

Finally, FIGS. 43-45 illustrate several different feeding systems that are available for performing a laser additive deposition process such as that which is shown in FIGS. 41-42. These systems include the lateral injection nozzle 104 shown in FIG. 43, the radially symmetric powder injection nozzles 106, 108 of FIG. 44, and the conical nozzle 110 and coaxial powder stream 112 shown in FIG. 45. Other feeding systems are also known in the art and can be employed in conjunction with the additive deposition system of the subject invention.

Although the methods of the subject invention and the products fabricated thereby have been described with respect to preferred embodiments, those skilled in the art will readily appreciate that changes and modifications may be made thereto without departing from the spirit and scope of the subject invention as defined by the appended claims

What is claimed is:

1. A method of assembling a fuel injector comprising the steps of:
    a) producing a feed arm of a fuel injector from a first alloy;
    b) depositing by laser additive deposition a second alloy onto a specified surface area of the feed arm; and
    c) forming a braze joint between an injector component and the feed arm at the specified surface area, wherein the injector component and the second alloy have a greater brazeability than the injector component and the first alloy.

2. A method according to claim 1, wherein the step of depositing includes depositing material in recessed areas formed in the surface of the feed arm.

3. A method according to claim 2, wherein the step of forming a braze joint includes joining a nozzle component to an interior surface of the feed arm.

* * * * *